Figure 1:
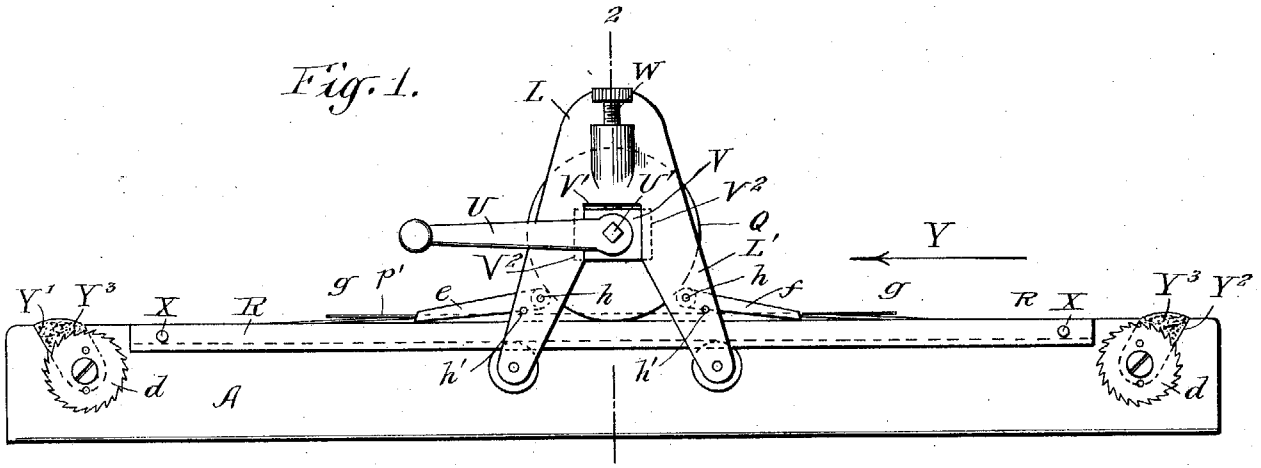

B. O. FANSLOW.

DUPLICATING PRINTING MACHINE.

APPLICATION FILED MAY 15, 1909.

Reissued Oct. 27, 1914.

13,817.

3 SHEETS—SHEET 1.

WITNESSES

H. Brockson

M. Gerkovitz

INVENTOR:

Benjamin O. Fanslow.

BY

Chas. McC. Chapman

ATTORNEY.

THE NORRIS PETERS CO., PHOTO-LITHO., WASHINGTON, D. C.

B. O. FANSLOW.

DUPLICATING PRINTING MACHINE.

APPLICATION FILED MAY 15, 1909.

Reissued Oct. 27, 1914.

13,817.

3 SHEETS—SHEET 2.

WITNESSES

St. Crocheron

M. Teskovitz

INVENTOR:

Benjamin O. Fanslow.

BY

Chas. H. C. Chapman,

ATTORNEY.

THE NORRIS PETERS CO., PHOTO-LITHO., WASHINGTON, D. C.

B. O. FANSLOW.

DUPLICATING PRINTING MACHINE.

APPLICATION FILED MAY 15, 1909.

Reissued Oct. 27, 1914.

13,817.

3 SHEETS—SHEET 3.

WITNESSES

St. Lockwood

M. Herbert

INVENTOR:

Benjamin O. Fanslow

BY

Chas. M. C. Chapman,

ATTORNEY.

THE NORRIS PETERS CO., PHOTO-LITHO., WASHINGTON, D. C.

UNITED STATES PATENT OFFICE.

BENJAMIN O. FANSLOW, OF WILLIAMSPORT, PENNSYLVANIA, ASSIGNOR, BY DIRECT AND MESNE ASSIGNMENTS, TO POLYGRAPH DUPLICATING TYPEWRITER COMPANY, A CORPORATION OF NEW YORK.

DUPLICATING PRINTING-MACHINE.

13,817. Specification of Reissued Letters Patent. Reissued Oct. 27, 1914.

Original No. 873,361, dated December 10, 1907, Serial No. 357,219. Application for reissue filed May 15, 1909. Serial No. 496,293.

*To all whom it may concern:*

Be it known that I, BENJAMIN O. FANSLOW, a citizen of the United States, residing in Williamsport, county of Lycoming, and State of Pennsylvania, have invented a new and useful Improvement in Duplicating Printing-Machines, of which the following is a description.

My invention relates to duplicating printing machines and particularly to that type of such machines which has become commercially known as polygraphs.

Among the objects of my invention may be noted the following: to provide a machine for reproducing copies of documents, drawings, pictorial representations, etc., which will be cheap, simple, easily manipulated, will not get out of order and with which a high class of work can be accomplished; to provide a construction by means of which, for every movement of the carriage, a complete copy can be produced, and in addition a movement of the inking-ribbon can be caused; to provide means by which an intermittent movement of the inking-ribbon can be produced, with variations of that movement, for every complete movement of the carriage; to provide means for creating an adjustable pressure of the impression-roller upon the face of the type or other composition; to provide means whereby relative yielding movement may be obtained between the impression-roller and the frame of the machine, or the composition carried thereby, such yielding movement being in a direction at an angle to the face of said composition; and to provide means whereby the rotation of the impression-roller causes its simultaneous travel on and relatively to the frame of the machine and the composition.

With the above objects in view, and others which will be detailed during the course of this description, my invention consists in the parts, features, elements and combinations of elements and mechanisms as hereinafter described and claimed.

Figure 2:
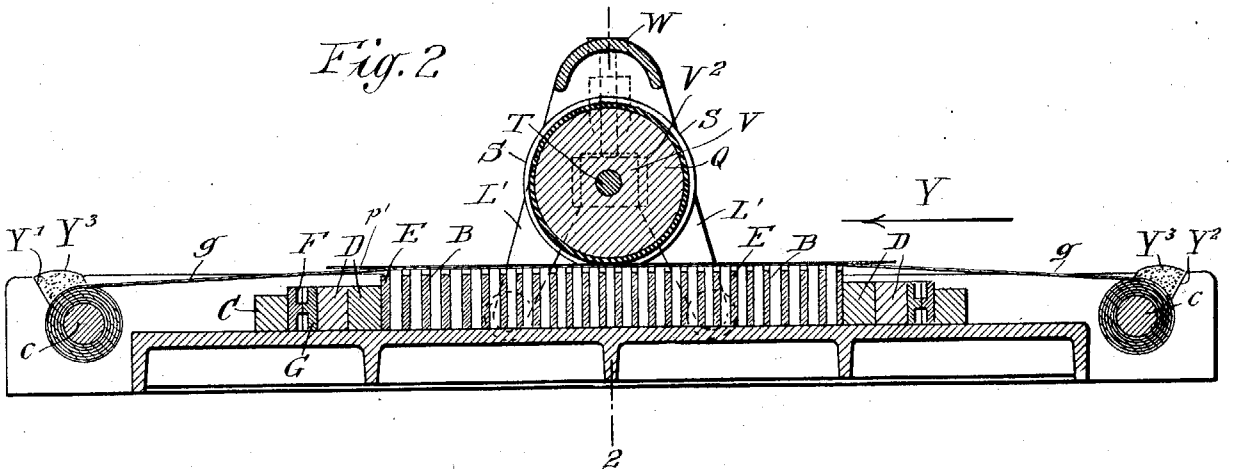
Figure 3:
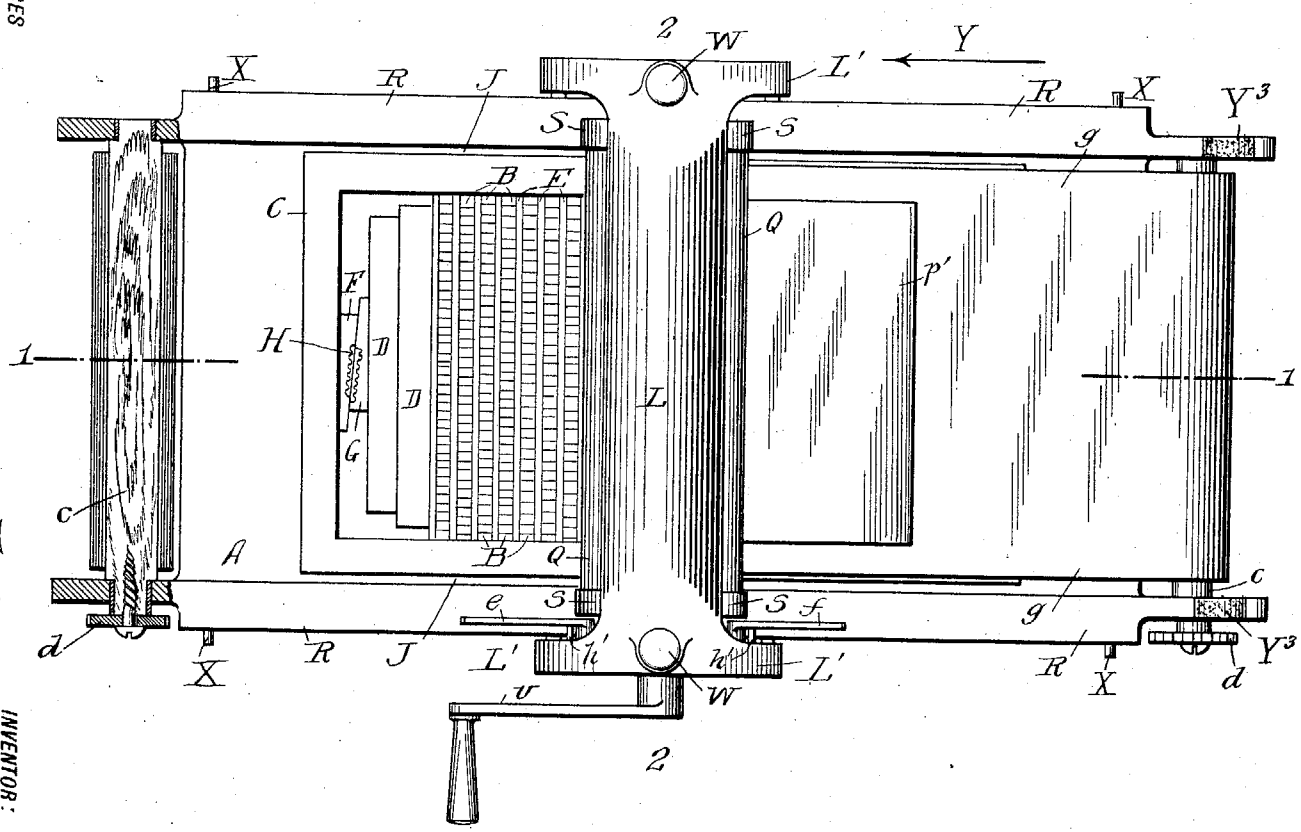
Figure 6:
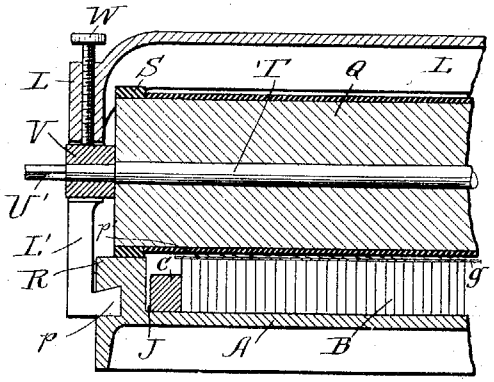
Figure 7:
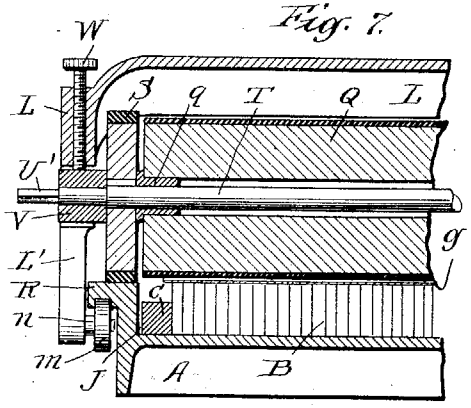
Figure 4:
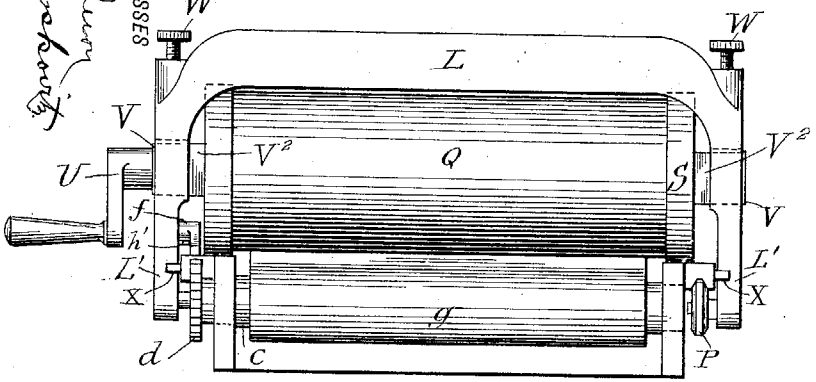
Figure 5:
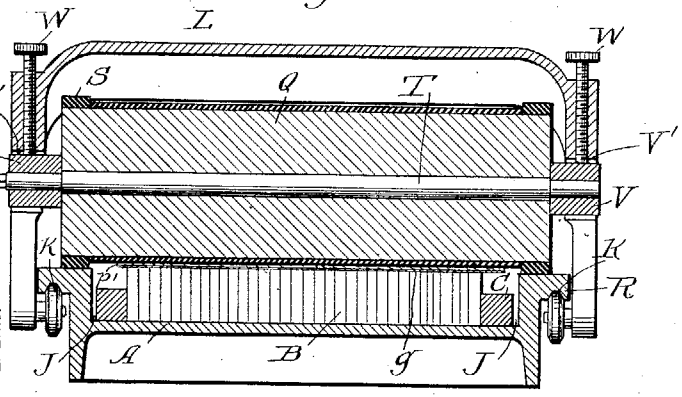

In order that my invention may be clearly understood, I have provided drawings, and therein:

Figure 1 is a side elevation of the machine constituting my invention; Fig. 2 is a longitudinal section of the same upon the line 1—1, Fig. 3; Fig. 3 is a plan of said machine partly broken away; Fig. 4 is an end elevation of said machine looking in the direction of the arrow Y, in Figs. 1, 2 and 3; Fig. 5 is a vertical section of my said machine upon the line 2—2, Figs. 1, 2 and 3; Fig. 6 is a cross-section of a part of the machine showing another form of the roller and carriage guiding means; Fig. 7 is a cross-section of a part of the machine showing another form of the roller and carriage guiding means.

In Fig. 1, 2, 3, 4 and 5, the horizontal base-portion of the frame is marked A, and it is shown as consisting of a flat plate of cast iron or equivalent material, whose upper surface is planed true and level. Upon this surface the types B, shown at Figs. 2, 3 and 5, are arranged in the chase C, wherein said types are retained operatively by the furniture D being forced against the type-slips E, and types B, by the toothed wedges F and G, in well understood manner.

Instead of the chase C, a rectangular frame or holder, in form similar to a galley, may be employed and the furniture D, F and G used to hold the type B and slips E therein. Instead of using type, which may be of any style desired, I may use a block of metal or wood having produced thereon, or carrying, a copy or copies of drawings, maps, pictorial representations, engraving, electrotype, or other character of composition, which block may be clamped in the chase, or the galley, or may rest upon the surface of the frame in the same manner as the chase and galley with the type or other composition clamped therein. The frame A is of such size as to provide a free space J on opposite sides of the chase or composition from end to end of the frame and, in fact, the surface of the latter is large enough to permit the free movement of said chase or composition upon the frame, to receive varying sizes of composition and to permit the proper disposition of the latter on the frame relatively to the impression cylinder.

The frame A is provided at its sides with oppositely projecting longitudinal flanges or rails R, in the under surface of each of which is formed a groove K, substantially V-shaped in cross-section, as shown in Figs. 4 and 5, and the top surface of which is made flat and smooth.

The carriage of my machine is formed of a single casting and has the top portion or bridge L, the opposite end portions of which depend at a right-angle to the bridge and are bifurcated to provide the spread legs L′, the crotches of which are squared to form guide-bearings V′. Each of the legs L′ carries a stud O, upon the inner end of which there is also carried rotatively the roller P, whose form and construction is more especially shown at Fig. 5. These rollers P press up into and against the surface of the grooves K, and conjointly with the influence of the elastic rolling-surfaces of the ends S, of the impression-roller Q, maintain the carriage and impression-roller Q in proper operative relationship with the base A, and in such manner that the carriage and the mechanism carried thereby cannot be dislocated from their proper relationship to and with the base A, either accidentally, or in any other manner than by taking asunder some of the parts for admitting of the separation, when required, of the carriage and its connections on the base A of the machine.

The diameter of the ends S, S, of the impression-roller Q, is preferably greater than the diameter of the intermediate portion of the impression-roller, and being of elastic material, such as vulcanized india rubber, these ends S, S, when rotated as hereinafter described, roll smoothly upon the upper surfaces of the rails R, R, and provide elastic, yielding action between the impression-roller and composition, between the carriage and frame and between the rollers P and the grooves K, and between the ends S of the impression-roller and the rails R.

The impression-roller Q is carried upon the axis T, one end of which is formed square as shown at U′, to receive thereon the crank-handle U, Figs. 1, 3 and 4, which, on being rotated by the hand of the operator, causes the carriage and the impression-roller to be moved bodily from end to end of the frame A. The impression-roller Q, in this form, is fastened rigidly to the shaft T, so that, as the latter is rotated, the roller Q is correspondingly rotated in either direction in addition to its bodily movement.

Squared journal-blocks V are provided which receive centrally the reduced journals T′ of the shaft T, said blocks each being retained in its guide-bearing V′ by means of the opposite flanges $V^2$ at the inner end thereof, said flanges engaging the inner surface of the adjacent legs L′ at opposite sides of the crotch. This structure prevents longitudinal displacement of the journal-blocks V, since the head produced by the flanges $V^2$ is located between the legs of the carriage and the adjacent end of the impression-roller, thus preventing longitudinal movement of the latter, maintaining the same in proper position, and preventing the ends S from leaving the rails. Hence, the coöperation of the impression-roller and composition, the coöperation of the ends S and rails, and the coöperation of the rollers P and grooves K are perfect. By means of the set-screws W, W, tapped into the ends of carriage L, and which, at their lower ends, bear upon the blocks V, it results, that by turning the set-screws W, in either direction, the pressure of the end-portions S, S, of the impression-roller, upon the rails R is regulated and the pressure of the rollers P, P, in their grooves K, K, is regulated with any required degree of elasticity for the efficient operation of the machine. This arrangement also enables the pressure of the intermediate part of the impression-roller Q, upon the paper, the ink-ribbon, and the printing surface, from which the copies or impressions are to be taken, to be regulated from time to time with the utmost nicety of adjustment.

At each end of the frame A there are recesses Y′ and $Y^2$, respectively, preferably inclined as shown at Figs. 1 and 2. In each pair of these recesses there is situated a bearing of the rollers *c* to which the printing-ribbon is attached, and by which the printing-ribbon is operated as hereinafter described. Each ribbon-roller or reel is provided with a ratchet-wheel *d*, at one of its ends, which is firmly fastened thereto, and the frame of the carriage at the same side of the machine whereat the ratchet-wheel *d* is situated carries pivoted to each leg L′ pawls *e* and *f*, respectively, as shown in Figs. 1 and 3. When the carriage and impression-roller of the machine are moved toward either end of the base A, either the pawl *e*, or the pawl *f* engages with one or the other of the ratchet-wheels *d*, *d*, according to the direction in which the carriage is being operated, and since each pawl *e* or *f* makes contact with one or the other of the ratchet-wheels *d*, before the carriage arrives at the termination of its travel, the further movement of the carriage causes the rotation of one or the other of the ribbon-reels through a distance corresponding to the distance through which the carriage moves, after the contact of either pawl *e* or *f* with its corresponding ratchet-wheel is made, and in this manner the printing-ribbon *g* is wound through a corresponding distance off one of the reels and upon the other. By this arrangement a fresh surface of printing-ribbon is presented to the type or other printing-surface, at each travby reason of its elasticity, is not only held in place, when pressed into the upper part of each bearing Y′ and Y², but also acts as an elastic drag upon the inking-ribbon-reels.

From the foregoing description, it will be understood that among the important features of my invention are the elastic ends of the impression-roller which, according to my invention, may be applied to the ends of said roller, as in Figs. 1 to 6, or may be applied to the periphery of a separate wheel or roller, as in Fig. 7, said ends, in either instance, being in effect elastic tires which hold frictionally and elastically upon the surfaces of the rail R.

Another important feature is the means by which the pressure of said tires on the traction surface of said rails is regulated, as well as the pressure of the impression-roller upon the surface of the composition.

Another important feature is the means by which the carriage is retained on the frame with anti-friction rolls P, capable of running in the grooves K and the impression roller maintained in proper coöperative relation to the composition and incapable of longitudinal movement, though compelled to rotate during its bodily movement with the carriage along the frame of the machine.

Another important feature is the means by which the ribbon is fed over the composition with an intermittent movement, first forward and then backward, and its movement in both directions varied or adjusted at will, so as to present new or fresh parts of said ribbon to the composition.

Another important feature is the means by which the ribbon-reels are frictionally engaged to prevent too rapid movement thereof, under the influence of the actuating pawls, thus avoiding any slack in the ribbon, or creasing or folding thereof, extending over the composition and insuring clean and uniform impressions.

Another important feature is the means whereby the impression-roller supports the carriage on the composition-holding frame, and in combination with means on said carriage the latter is retained in proper relation to said frame. And another important feature is the means for so combining the carriage and impression-roller that the latter may rotate relatively to the carriage and at the same time the two may be traversed along the frame, the latter and carriage maintained in proper coöperative relation, and the roller held in proper relation to the composition.

From the foregoing description, the operation of my machine will be clearly understood, but it may be stated that, with the ribbon wound upon the opposite reels, as shown in Figs. 1, 2 and 3, and extending between the same over the composition and with the carriage moved to one extreme end of the frame, and a sheet of paper *p*, lying upon the ribbon and properly over the composition, the machine is ready for work. Now, by turning the handle U rotary movement is imparted directly to the impression-roller through its axle T; and, since the elastic tires of peripheries at the ends of the said roller bear with the requisite amount of pressure upon the traction surface of the rails R of the frame and the anti-friction rolls P are located in the grooves beneath said traction surface, the rotation of the impression-roller, through the frictional grasp of the elastic tires or ends S upon the said traction surface, will bodily move the carriage and roller from end to end of the frame A. During this movement, the rotation of the impression-roller passing over the paper and pressing it upon the ribbon, and the latter upon the face of the composition, will transfer the latter to the paper on the bottom surface thereof. As the carriage approaches the end of its travel along the frame, one or the other of the pawls *e*, *f*, will engage a ratchet-wheel *d* carried by one of the ribbon-reels, resulting in turning said reel and winding the ribbon thereon and off of the other reel a given amount, which is predetermined; and, since the pawl *e*, for example, is slightly longer than the pawl *f*, the ribbon-reel, at the left-hand end of the frame,—see Fig. 1,—will be caused to wind up a greater length of ribbon than the pawl *f* will at the opposite end of the frame. In consequence, there will be a forward feed of the ribbon for a given distance and a backward feed of the ribbon for a given distance somewhat less than the forward feed of the ribbon, resulting in always presenting to the composition, if of line character, fresh ribbon surfaces for printing purposes. The same effect in the feed of the ribbon may be accomplished by having the pawls *e* and *f* of the same length and shifting one or the other thereof from a pin *h* to a pin *h′*, or vice versa. Since the roller, with the elastic ends or resilient devices at its ends, is mounted to roll or rotate relatively to the frame and composition held thereby and the journal-blocks V are free to slide in the squared crotch of the carriage, it is clear that the roller practically supports the carriage and helps maintain it in its position on the frame; but, the coöperative relation and arrangement of the parts are such that neither the carriage, nor the roller can be removed from the frame except together, as in dismantling the apparatus. Moreover, by means of the adjusting-screws W, which bear upon the tops of the journal-blocks V, the elastic peripheries or resilient devices S can be made to bear with more or less pressure and friction upon the traction surfaces erse of the carriage and impression-roller, and anteriorly to making the next succeeding impression or printing operation; the rotation of one ribbon-reel being about twice that of the other. This variation in the amount of rotation of the two ribbon-reels results from different lengths of the pawls *e*, *f*,—which may be of equal lengths,—and when of different lengths one of these pawls operates upon one of the ratchet-wheels *d* for a longer time than the other pawl operates upon the other ratchet-wheel *d*.

To insure the requisite length of movement of the ribbon-reels for producing the requisite movement of the ribbon *g*, the pawls *e* and *f*, carried pivotally upon the pins *h*, *h*, rest upon the top surface of one of the rails R, as shown in Figs. 1 and 3, and are made of different lengths or are the same length, as previously stated. If of different lengths said pawls will be interchangeable with each other, or with others of different lengths upon the said pins *h*; but, if said pawls are made the same length, they will be adjustable on the legs by shifting, one or both, from a pin *h* to a pin *h'*. In the first case, according to the length of the pawls *e*, *f*, the ribbon may be fed, for each full movement of the carriage on the frame, a certain distance forward and a shorter distance backward, according to the difference in length of said pawls, thus always presenting a new or comparatively fresh portion of the ribbon to the type. In the latter case, according to the position of the pawls *e*, *f*, on the legs L' of the carriage,—the pawls being shiftable or adjustable from pins *h* to pins *h'* at will,—the ribbon may be fed forward and backward in the same manner and for the same purpose as noted in the first case. It will be understood that the manner of interchanging pawls, or of adjusting them, will depend upon the direction of movement of the ribbon, which may be in either direction lengthwise of the frame, since the ratchet-wheels are set on their reels for operation in opposite directions, this disposition also enabling the ribbon to be wound from one reel onto the other and then back onto the first reel, until the ribbon is so badly worn as to be of no further use.

Instead of operating the carriage hereinbefore described by turning the crank-handle U, it may be operated by the attendant applying his hand to the bridge L and pushing or pulling the carriage horizontally, causing it and the impression-roller to make the successive journeys or traverses upon the frame of the machine which have already been described as being performed by turning the crank-handle U. When the machine is operated by pushing or pulling the carriage or impression-roller, then the crank-handle U may be taken off the axis T; but it is not necessary to remove the crank-handle U in order to operate the machine by pushing or pulling upon the bridge L.

Instead of using the V-shaped grooves K, K, in the bottom of the rails R, R, as shown at Figs. 1, 2 and 5, the under parts of the rails R may be constructed with a rectangular groove as shown at Fig. 7, in which case, instead of using the V-shaped rollers P, P, a cylindrical roller *m*, carried upon the stud *n*, fixed in the lower ends of the legs L', may be substituted. Instead of using either the rollers P, as in Fig. 5, or the rollers *m*, as in Fig. 7, the lower ends of the legs L' may be formed with an inwardly projecting lug *p*, preferably of dovetail form, fitting into a dovetail groove in the longitudinal sides of the frame A, as in Fig. 6.

Instead of so constructing the impression-roller Q that it is firmly fixed upon its shaft T, so that the shaft T and the impression-roller Q rotate as one, the roller Q and the end-portions S, S, may be constructed separately as shown at Fig. 7, in which case the end-portions S, S, are keyed or otherwise firmly fixed to the axle T, while the impression-roller Q has fastened into its ends a bushing *q*, which enables the impression-roller Q to rotate upon the axle T.

I desire it to be understood that, when using my machine for printing copies of drawings, maps, landscapes, pictures, etc., or when used for making copies of representations wherein there are not parallel lines, such as the lines of type in typewriting, or the lines in writing in ordinary manuscript, or the lines of engraving, such as is used in the production of public state and national documents, wills, and other papers written by hand, or copies of copper or steel engravings wherein lines of writing or literary signs are placed in parallel, I do not in such cases use the pawls and ratchets for regulating the motion of the inking-ribbon carried upon the reels *c*, but instead thereof, when a larger surface is to be printed at each successive impression, I then remove the pawl and ratchet gearing from my machine and feed, by the attendant applying his hand to one of the inking-ribbon reels, a new surface of inking-ribbon of sufficient length corresponding to such surface for each such impression when necessary.

The frame A of the machine is provided with four projecting pins X, X, X, X, which check the travel of the carriage, in either direction, by engaging with legs L' of the carriage.

For the purpose of maintaining sufficient frictional resistance upon the bearings of the inking-ribbon reels, there is pressed into the upper part of the bearings Y' and $Y^2$ a correspondingly shaped block of india rubber, as shown at $Y^3$, in Figs. 1 and 2, which, of the rails R and, likewise, the roller will bear with more or less pressure upon the surface of the composition and the carriage will be elevated more or less, thus causing its anti-friction rolls or devices to more or less intimately coöperate with the grooves of the frame. The more the pressure and friction between the parts, the more positive will be the drive of the carriage and the rotation of the impression-roller, as will be readily understood. The elastic tires or peripheries S, at the ends of the impression-roller, in combination with the other structural features of the apparatus, create between the frame and the impression-roller a relative yielding action, which is one of the important features of my invention, since any unevenness in the surface of the composition will be readily compensated for and all the parts of the structure will be held in such close relation as to make their coöperative action positive, noiseless and easy. The stops X, at opposite ends of the frame, which engage the opposite legs of the carriage, not only limit the movement of the carriage on the frame and constitute the terminal of action of the pawls *e* and *f*, but also prevent the carriage and roller from losing their proper coöperative relation with respect to the frame. These stops can be removed when it is desired to dismantle the apparatus.

Having thus described my invention, what I claim and desire to secure by Letters Patent is:

1. In combination, a frame for supporting the composition to be reproduced; a carriage and an impression-roller mounted to travel on said frame and combined by means enabling the roller to rotate relatively to the carriage; means carried by the roller whereby the said roller may be rotated and the said carriage moved along the said frame; and an inking ribbon supported to operate between the composition and the impression-roller.

2. In combination, a frame for supporting the composition to be reproduced; a carriage for traveling on said frame; an impression-roller combined with the carriage by means enabling it to rotate relatively thereto; means carried by the roller whereby the carriage may be moved along the frame and said roller simultaneously rotated; means for varying the pressure of the roller on the said composition; and an inking ribbon supported to operate between the composition and the impression-roller.

3. In combination, a frame for supporting the composition to be reproduced; a carriage for traveling on said frame having opposite guide-bearings open at the bottom; journal-blocks working in said guide-bearings; an impression roller journaled in said blocks; means carried by the roller whereby the latter may be rotated and the carriage moved along the frame; means for adjusting said blocks in the carriage to vary the pressure of the roller on the said composition; and an inking ribbon supported to operate between the composition and the impression-roller.

4. In combination, a frame for supporting the composition to be reproduced; a carriage for traveling on said frame having an impression-roller combined therewith by means enabling it to have rotation relatively thereto; means for retaining the carriage on the frame and maintaining the said roller in coöperation with the said composition; and means carried by either the frame or roller for producing a yielding frictional action between the said roller and frame.

5. In combination, a frame for supporting the composition to be reproduced; a carriage for traveling on the said frame having an impression-roller combined therewith by means maintaining it in coöperation with the composition and enabling it to rotate relatively thereto; and means carried by either the frame or roller for producing a variable yielding action between the said roller and frame.

6. In combination, a type-holding frame; a carriage; an impression-roller mounted to rotate relatively to said carriage; yielding friction means between the roller and frame for maintaining the two yieldingly in coöperation; and means whereby the carriage may be traversed bodily along the frame, thus causing the rotation of the roller through the medium of the yielding friction means.

7. In combination, a type-holding frame; a carriage mounted to travel on said frame; an impression-roller combined with the carriage by means such that said roller may rotate relatively to said carriage; and means carried by either the frame or roller for holding the said roller yieldingly and frictionally in engagement with the frame.

8. In combination, a type-holding frame; a carriage mounted to travel on said frame, and an impression-roller journaled to rotate relatively to said carriage while traveling on said frame, means carried by either the roller or frame to produce a yielding frictional connection between the frame and roller.

9. In combination, a type-holding frame; a carriage mounted to travel relatively to said frame; an impression-roller mounted to rotate relatively to said carriage and frame, and having means engaging said frame whereby the coöperative relation of said carriage, roller and frame is maintained; and means carried by the roller whereby when the carriage is moved along the frame said roller will be rotated.

10. In combination, a type-holding frame having parallel traction surfaces above parallel grooves; a carriage and an impression-roller combined by means such that the roller is free to rotate relatively to the carriage; means on the carriage coöperating with the said grooves and surfaces of the frame whereby the carriage and roller are maintained in operative relation to the frame; and means carried by the roller whereby the carriage may be moved along the frame and the roller rotated.

11. In combination, a type-holding frame; a carriage having an impression-roller journaled thereon, said carriage being mounted on the frame and combined therewith by means such that the roller is free to rotate relatively to the carriage and the latter to move on the frame-ribbon-reels mounted at opposite ends of the frame; means whereby the carriage may be moved along the frame and the roller rotated; and means whereby as the carriage reaches the end of its travel in both directions on the frame the ribbon may be moved a predetermined amount relatively to the latter.

12. In combination, a type-holding frame; a carriage and an impression-roller mounted on the frame and combined by means such that the roller is free to rotate relatively to the carriage; ribbon-reels mounted at opposite ends of the frame; means whereby the carriage may be moved along the frame and the roller rotated; and means for actuating the ribbon-reels so as to feed the ribbon alternately different degrees in opposite directions.

13. In combination, a type-holding frame; a carriage; an impression-roller mounted to rotate relatively to said carriage; ribbon-reels mounted at opposite ends of the frame; coöperating means between the ends of the ribbon-reels and the carriage for actuating the ribbon-reels; and stop-devices for limiting the movement of the carriage on the frame in opposite directions.

14. In combination, a type-holding frame; a carriage; an impression-roller mounted on the carriage to rotate relatively to said carriage; ribbon-reels mounted on opposite ends of the frame; means for actuating the ribbon-reels; means for actuating the frame and carriage relatively; and means for producing friction upon the ribbon-reels to prevent too rapid rotation thereof.

15. In combination, a type-holding frame; a carriage carrying an impression-roller mounted on the frame and combined by means such that the roller may rotate relatively to the carriage; means for moving the carriage and frame relatively; ribbon-reels mounted at opposite ends of the frame; and means whereby the rotation of the ribbon-reels may be varied at will to give to the ribbon a feed movement of predetermined extent.

16. In combination, a type-holding frame; a carriage; an impression-roller mounted to rotate relatively to the carriage; means for moving the carriage and the frame relatively; ribbon-reels mounted one at each end of the frame; and detachable, interchangeable and variably actuated means for actuating the ribbon-reels mounted on the carriage, whereby to vary the rotation of the ribbon-reels.

17. In combination, a type-holding frame; a carriage and an impression-roller mounted on the frame and combined by a yielding means such that the roller may rotate relatively to the carriage and have a yielding engagement with the form; the carriage consisting of a frame providing a bridge with depending end-portions; means between the frame and the end-portions of said carriage for maintaining an operative connection between the latter and the frame; and means mounted on the carriage whereby the carriage and frame may be moved relatively and the impression-roller simultaneously rotated.

18. In combination, a type-holding frame; a carriage and an impression-roller mounted on the frame and combined by means such that the roller may rotate relatively to the carriage and have a yielding engagement with the form; the carriage consisting of a frame providing a bridge with depending, bifurcated, end-portions; anti-friction means between the frame and said end-portions of the carriage for maintaining an operative connection between the latter and the frame; and means mounted on the carriage whereby the carriage and frame may be moved relatively and the impression-roller simultaneously rotated.

19. In combination, a type-holding frame; a carriage mounted to travel on said frame; an impression-roller combined with the carriage by means such that said roller may rotate relatively to said carriage; means on the carriage for causing the roller to rotate and the carriage to travel; and means for holding said roller to its work comprising a resilient device carried by each end of said roller.

20. In combination, a type-holding frame; a carriage mounted to travel on said frame; an impression-roller combined with the carriage by means such that said roller may rotate relatively to said carriage; means on the carriage for causing the roller to rotate and the carriage to travel; said carriage having anti-friction means coöperating with the frame, and said roller carrying elastic means on its ends coöperating with said frame, the said anti-friction and elastic means being combined so as to maintain the carriage in operative relation to the frame and produce a relative yielding action between said frame and roller.

21. In combination, a frame for supporting the composition to be reproduced; a carriage and an impression-roller combined by means such that the latter may rotate relatively to the former; ribbon-reels mounted to rotate at opposite ends of said frame; means whereby the carriage and frame may be moved relatively and the roller simultaneously rotated; and means carried by one of said elements and said reels, whereby at the end of each relative movement of said frame and carriage, the ribbon may be fed a predetermined distance over the composition.

22. In combination, a type-holding frame; a carriage having slide-bearings; an impression-roller having journal-blocks fitted to said bearings and having heads located between the carriage and roller; means adjacent the heads coöperating with the frame, and means on the carriage coöperating with the frame, said two means being combined to hold the roller and carriage yieldingly in coöperative relation; and means for moving the carriage and frame relatively and simultaneously rotating said roller.

23. In combination with a frame for holding composition, a carriage having an impression-roller journaled therein; means between the frame and carriage for maintaining the two and the impression-roller in coöperative relation; means between the roller and the frame enabling the one to actuate the other; means carried by the carriage for driving the impression-roller and, through the medium of the other means recited, move the carriage and frame relatively; a ribbon mounted upon reels so as to coöperate with the composition and move relatively thereto and to the carriage; and means carried by the reels and by the carriage for intermittently actuating the ribbon.

In witness whereof, I have hereunto set my hand in the presence of two witnesses.

BENJAMIN O. FANSLOW.

Witnesses:

CHAS. McC. CHAPMAN,
FLORENCE ATERO IVES.

Copies of this patent may be obtained for five cents each, by addressing the "Commissioner of Patents, Washington, D. C."